Figure 1:
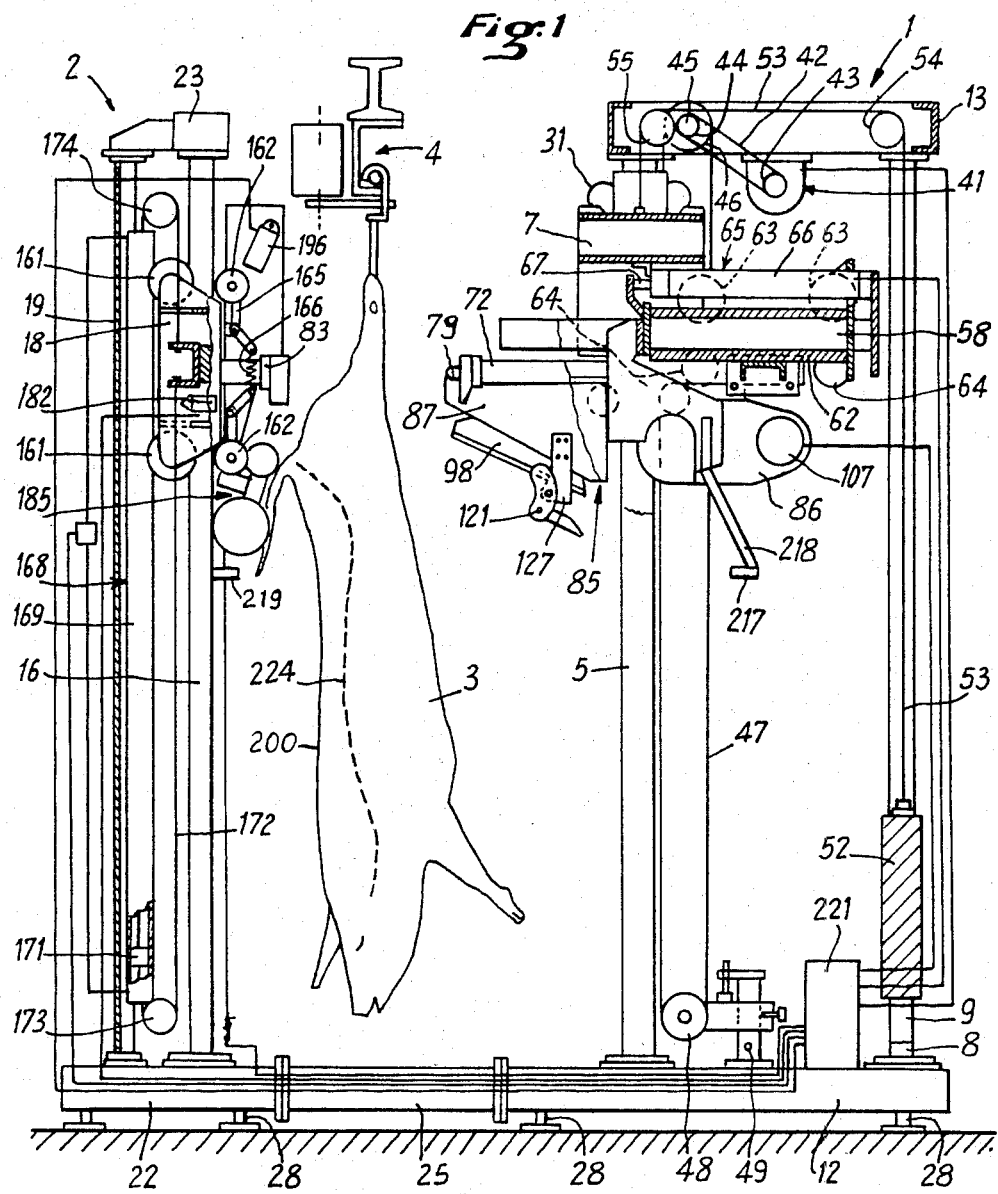

United States Patent [19]

Herubel

[11] Patent Number: 4,507,822

[45] Date of Patent: Apr. 2, 1985

[54] AUTOMATIC MACHINE FOR SPLITTING BUTCHERY ANIMALS, NOTABLY PIGS

[75] Inventor: Jean-Frédéric Herubel, Guebwiller, France

[73] Assignee: N. Schlumberger and Cie, Guebwiller, France

[21] Appl. No.: 551,314

[22] Filed: Nov. 14, 1983

[30] Foreign Application Priority Data

Nov. 15, 1982 [FR] France ................ 82 19057

[51] Int. Cl.³ .................................................. A22B 5/20
[52] U.S. Cl. .......................................................... 17/23
[58] Field of Search ............................................ 17/23

[56] References Cited

U.S. PATENT DOCUMENTS

| | | | |
|---|---|---|---|
| 3,402,425 | 9/1968 | Wexel | 17/23 |
| 4,262,388 | 4/1981 | Durand et al. | 17/23 X |
| 4,337,550 | 7/1982 | Baylor et al. | 17/23 |

Primary Examiner—Willie G. Abercrombie
Attorney, Agent, or Firm—Murray, Whisenhunt and Ferguson

[57] ABSTRACT

The invention relates to the butchery industry.

The machine comprises notably: a vertical splitting carrier mobile along a first column, a mobile horizontal carrier on the splitting vertical carrier, a splitting blade carried by the horizontal carrier, a resilient dorsal guide mobile on a second column, two horizontal arms for encompassing the animal to be slit, rigidly connected to the horizontal carrier and adapted for being connected to the dorsal carrier, and inner guiding means of the spine of the animal to be split, connected to the horizontal carrier.

The invention is applicable to the splitting of butchery animals, notably pigs.

3 Claims, 9 Drawing Figures

AUTOMATIC MACHINE FOR SPLITTING BUTCHERY ANIMALS, NOTABLY PIGS

The present invention relates to an automatic machine for splitting lengthwise butchery animals, and more particularly pigs.

Hitherto, the splitting of pigs has been carried out manually or mechanically, but these two methods have drawbacks.

The manual splitting, although quite clean, accurate and well-finished, is very costly and time consuming and requires qualified personnel as well as very large working surfaces. Therefore, the manual splitting operation is very costly and very little profit-earning, mainly when the present large scale productions are involved.

Efforts have been made to mechanize or automate the splitting by using a splitting axe or cleaver which splits the spine or backbone all along in its middle, since this is most important in the profession. For so doing a guide finger has been conceived, which fits into the medullary canal of the animal and should allow splitting each vertebra and by way of consequence the spine as a whole. But this type of guiding, although attractive, has not provided the results hoped for since said guiding finger is often deformed and twisted.

Moreover, said guiding finger, on the one hand, allowed splitting along the medullary canal but not necessarily the middle of the dorsal apophysis and on the other hand left the marrow more or less scattered everywhere on the bones and meat, which, due to the quick oxidation of marrow, left marks on the meat rendering it very quickly unsuitable for display on the meat stall. It was therefore not possible to take this principle in consideration for a continuous splitting operation which requires accuracy, sturdiness and reliability.

Finally and always with the same concern of well quiding the cleaver in mind, splitting machines surrounding thoroughly the animal to be split, clamping each part, have been conceived, thereby leading finally to an imposing, cumbersome and costly machine. Indeed, such a machine is large, voluminous and provided with many pads, rollers, clamps and other support means making it heavy, slow and little reliable. This splitting principle therefore does not meet either the speed and reliability requirements.

Presently, the manual splitting of pigs calls at least for three of four splitters. Each splitter can split from 60 to 80 pigs/h, and the lines have a throughput of 120, 250, 360, sometimes 550 and even 750 pigs/h. When the rates are low, it is still possible to mechanically split without automatic arrangements, but from rates of 240 pigs/h and more, an automated splitting arrangement has to be designed. It has been considered to use either a saw or a cleaver pneumatically controlled. If the saw permits high rates, up to 450 pigs/h, the work done on the pig is not appreciated by everybody since the saw tends to damage the meat, this having an effect on its preservation. On the other hand, the mechanized cleaver performs the same work as the axe, but does not permit a rate over 240 pigs/h. Furthermore, a worker has to be used for operating the cutting member when using either the saw or the mechanized cleaver.

The object of the invention is to provide a machine which remedies the aforementioned drawbacks of the machines of the prior art. It is applicable in installations designed so that as soon as an animal is detected by the splitting machine, a device disengages it from the slaughtering line, brings it rapidly in front of the splitting station of the machine, splits it and then reintroduces it in the slaughtering line, while the following pig is brought in front of the splitting station.

The machine according to the invention is characterized in that it comprises: a first fixed column, a second fixed column providing, between itself and the first fixed column, a receiving interval for an animal to be split; a vertical splitting carrier movable along the first fixed column; an horizontal splitting carrier movable horizontally on the vertical splitting carrier so as to move toward and away from the second column; a splitting head rigidly connected to the horizontal splitting carrier; a splitting blade mounted on the splitting head and imparted, in its own plane, with an oscillating motion having horizontal and vertical components; a dorsal guiding carrier for the animal to be split, vertically movable on the second fixed column; a dorsal guide movable on the dorsal guiding carrier, in the direction of the first fixed column; two horizontal arms for laterally encompassing the animal to be split, rigidly connected to the horizontal splitting carrier and the distal ends of which carry end-pieces adapted for engaging respectively two recesses, having a shape matching that of said end-pieces, formed into pads rigidly connected to the dorsal guiding carrier; inner guiding means of the spine of the animal to be split, carried by the splitting head; control means for the movements of the horizontal splitting carrier; control means for the working downward stroke of the vertical splitting carrier and for the rapid off-load return stroke of said carrier; means for the rapid return upward stroke of the dorsal guiding carrier; resilient means for controlling the application of the dorsal guide against the back of the animal to be split; means adapted for bringing in the aforementioned interval between the two fixed columns an animal to be split and hung by its rear legs, and for carrying it away; means for determining the effective stroke length of the vertical splitting carrier and a programmer for the sequential activation of all the aforementioned control means for carrying out the successive splitting cycles.

As soon as a pig reaches the front of the machine, the following operations are immediately performed: clamping of the pig by moving forward the splitting head and activation of the dorsal device for stabilizing the pig; actuation of the splitting blade, downward movement of the carrier unit forming a most rigid block, detected at the end of the stroke by a photoelectric cell, stoppage of the downward movement of the carrier unit, backward movement of the splitting head, stoppage of the movement of the splitting blade, and return upwardly of the splitting head to its starting point, as well as of the dorsal device stabilizing the pig.

Due to this particular structure and once the end pieces of the horizontal carrier arms which carries the splitting head are engaged into the corresponding recesses of the dorsal guiding carrier pads, said two carriers form a perfectly rigid unit so that the splitting head with its cutting blade and the inner guide of the spine of the animal to be split, rigidly connected to the vertical splitting carrier mobile on the first column, as well as the dorsal guide carried by the dorsal guiding carrier mobile on the second column, can move downwardly along the pig to be split while preserving all the time relative positions which are rigorously identical till the end of their movements, since they pertain to an assembly which is very rigid per se, this being already a first condition necessary for performing an accurate splitting. Then, the dorsal guide maintains rigidly the pig by centering it accurately along all the length of the working stroke of the splitting blade while the inner guide, carried by the splitting head, cooperates for maintaining the animal spine perfectly centered relative to the splitting blade, while possibly providing for its straightening up, if need be. Under such conditions, one will appreciate the reasons for which the machine allows performing a very accurate splitting quite surely, and yet very quickly. The precision of the work can still be increased if, as is provided in an advantageous embodiment of the invention, the upper portion of the dorsal guide and the upper portion of the inner guide of the spine are each formed with a receiving and guiding slit for the splitting blade. The work done is clean and straightforward. Moreover, the conservation of the halfbodies is at least as good as when the work is done by hand.

Due to the automation of the machine, a rate of 360 to 400 pigs/h can be reached, and this without amploying any personnel. Moreover, if two machines are used in parallel, rates of 700 to 750 pigs/h can be reached.

The invention will be better understood from the reading of the following description with reference to the accompanying drawings showing, by way of example, an embodiment of the invention.

Figure 1A:
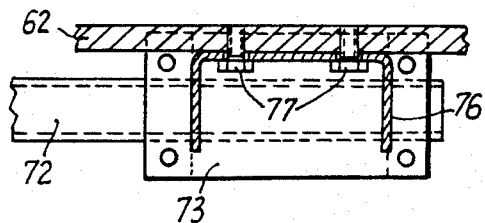
Figure 1B:
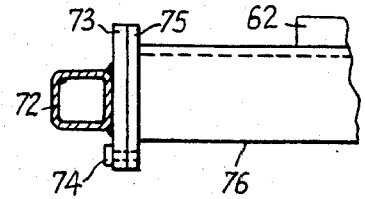
Figure 2:
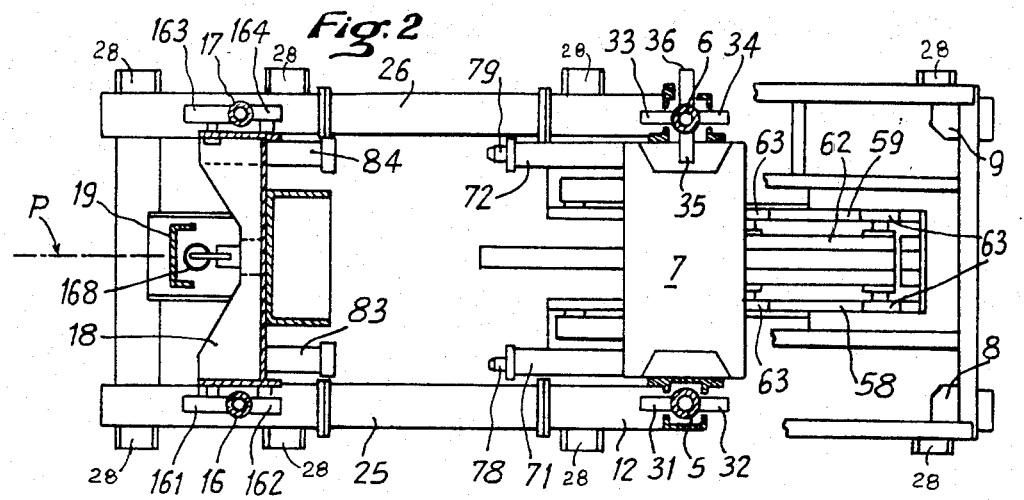
Figure 3:
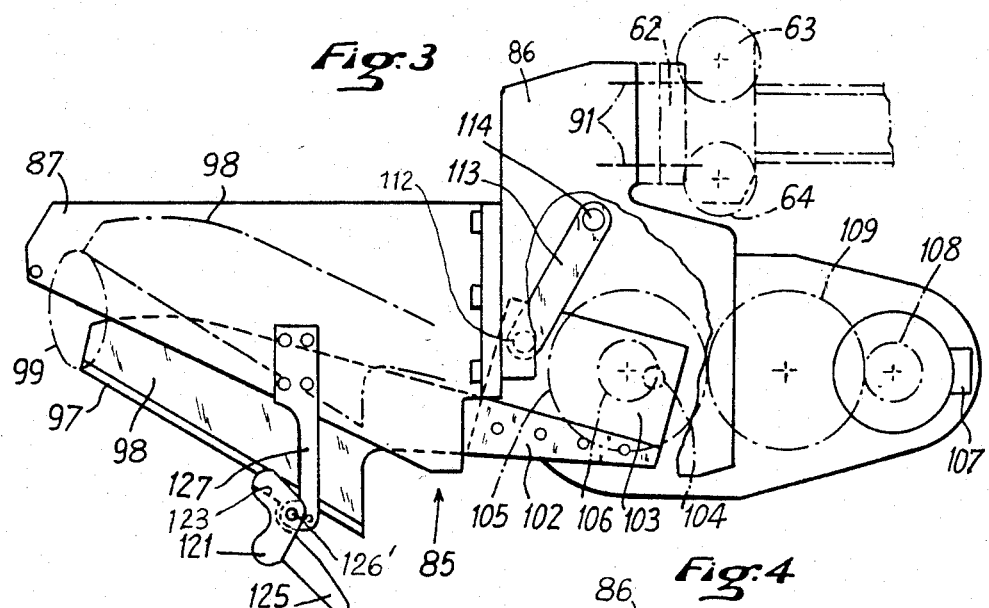
Figure 4:
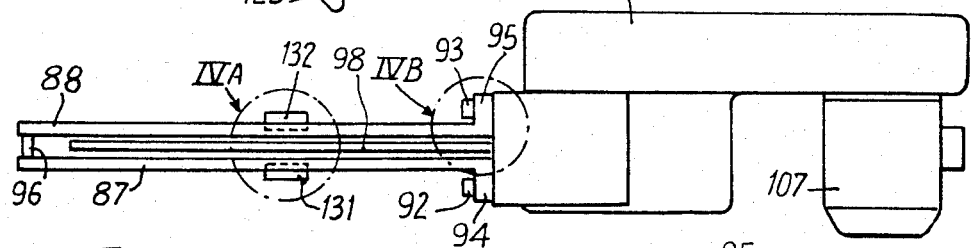
Figure 4A:
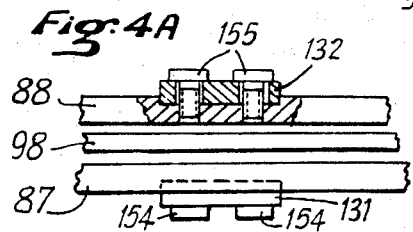
Figure 4B:
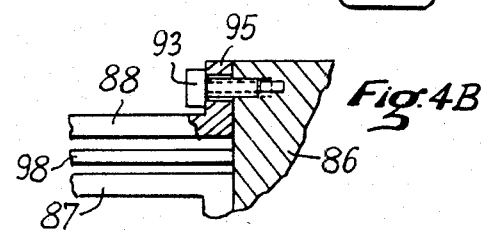
Figure 5:
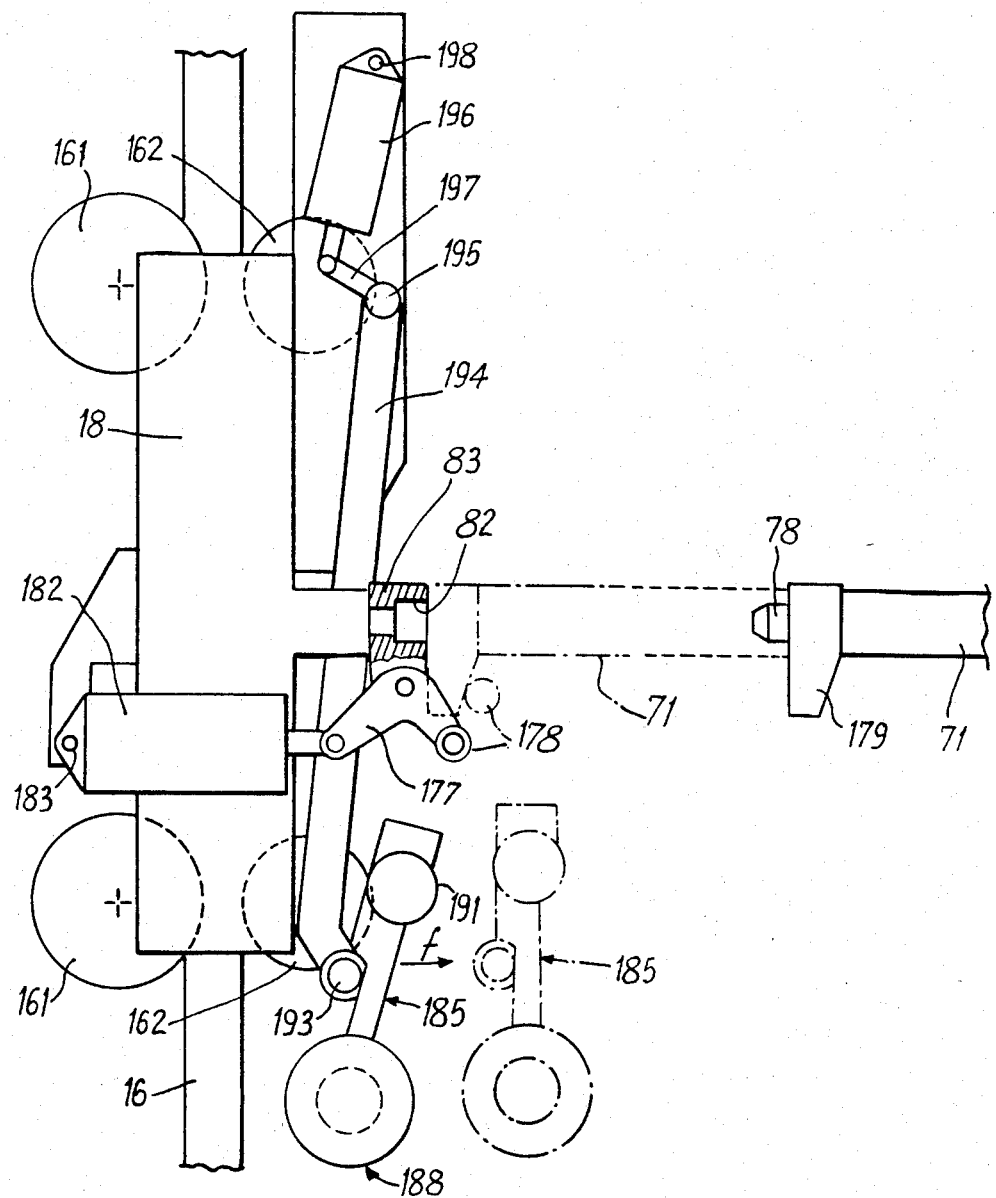

In the drawings:

FIG. 1 is a profile of the machine with parts cut away,

FIG. 1A shows at a larger scale a detail of the horizontal splitting carrier visible in FIG. 1, FIG. 1B is a frontal view corresponding to FIG. 1A, FIG. 2 is a plan view corresponding to FIG. 1, FIG. 3 is a profile view at a larger scale of the splitting head, FIG. 4 is a plan view corresponding to FIG. 3, FIGS. 4A and 4B show still at a larger scale details of FIG. 4 surrounded by the circles designated at 4A and 4B, and FIG. 5 is also at a large scale a profile view of the equipped dorsal guiding carrier.

The pig splitting machine shown in FIG. 1 and 2 includes a first fixed column designated as a whole by reference 1 and forming the rear part of the machine, as well as a second fixed column designated as a whole by reference 2 and forming the front part of the machine. Between the two columns is a receiving space for a pig to be split 3, hung by its rear legs by any known and appropriate means shown at 4.

In the example, the first fixed column 1 comprises two main cylindrical uprights 5, 6 for guiding a vertical splitting carrier 7 and two auxiliary uprights 8, 9. All said uprights are braced, at their lower portion, by a frame having three sides made of square section tubes 12 and, at their upper portion, by a frame 13 made of "U"-shaped irons. The second fixed column 2 comprises two main cylindrical uprights 16, 17 sustaining a dorsal guiding carrier 18 and a U-shaped auxiliary upright 19; said various uprights are braced, at their lower portion, by a three-sided frame made of square section tubes 22 and, at their upper portion, by a type of crosspiece 23 of general "T" shape. The two lower frames 12 and 22 are rigidly connected to each other by two square tube stumps 25, 26 assembled end against end with the lateral sides of the two frames, by means of flanges and bolts. The machine base bears on the ground via legs 28. As an alternative, the two columns could be sealed into the ground.

Generally speaking, the machine is symmetrical relative to a vertical geometrical plane designated at "P" in FIG. 2 and which is therefore substantially a median longitudinal vertical plane.

The vertical splitting carrier 7 is provided, at its lower portion and at its upper portion, on its left-hand side, with two rollers 31, 32 rolling respectively against the front and rear faces of upright 5 and, on its right-hand side, with two similar rollers 33, 34 rolling respectively against the front and rear faces of upright 6, as well as two other rollers 35, 36 rolling respectively against the inner lateral face and against the outer lateral face of said upright 6 for positioning the vertical splitting carrier in a lateral direction.

The vertical movements of the carrier are provided by an electric motor 41 rotating in both ways and having a rapid return speed upwardly, fixed to the upper portion of column 1, via a transmission comprising a chain 42 passing over a chain wheel 43 of the motor and on a chain wheel 44 carried by an intermediate chaft 45 carrying also a wheel 46 on which passes a vertical chain 47 guided by a lower pulley 48, the two ends of said chain being connected to the carrier; the lower pulley 48 is carried by a tension setting device of any standard and appropriate type and designated as a whole by reference 49. The weight of the mobile equipment formed by the vertical splitting carrier 7 as well as by all the members which it carries and which will be now described is balanced by a counter-weight 52 fixed at the lower end of a chain 53 the upper portion of which passes over two return pulleys 54 and 55 while its other end is attached to the carrier.

The vertical splitting carrier 7 carries two longitudinal horizontal rails 58, 59 for supporting and guiding the horizontal splitting carrier 62 provided with upper 63 and lower 64 rolling rollers, those which are on one side being conveniently formed with a profile providing at the same time a side positioning of said horizontal carrier; the displacements of the latter are provided by a horizontal jack controlled by a fluid under pressure 65 the cylinder 66 of which is rigidly connected to the vertical splitting carrier 7 and the piston rod 67 of which is rigidly connected to the horizontal carrier.

The horizontal splitting carrier 62 is provided with two arms 71, 72 used for encompassing a pig to be split and also to provide the downward movement of the dorsal guiding vertical carrier 18 mounted on the second column 2, as will appear clearly hereafter. Each of said two arms, for example arm 72, is formed of a square section tube (see also FIGS. 1A and 1B) welded flat against a longitudinal vertical plate 73 fixed by screws 74 against another plate 75 on which is butt-welded an end of a cross-piece 76, of inverted U-shaped section, the other end of which is butt-welded against a plate similar to plate 75 and used as a support for the other arm 71. The cross-piece 76 is fixed flatwise against the lower face of the horizontal splitting carrier 62 by means of screws 77. The distal ends of the two arms 71, 72 carry end-pieces 78, 79 adapted for engaging, at the end of the advance stroke of the horizontal splitting carrier toward the second column 2, respectively into two recesses such as 82 (see also FIG. 5) having a shape matching that of said end-pieces, formed into pads 83, 84 rigidly connected to the dorsal guiding carrier 18, thereby allowing the dorsal guiding carrier to be rigidly connected to the vertical splitting carrier 7.

The horizontal splitting carrier 62 carriers a splitting head designated as a whole by reference 85 and the general structure of which comprises a casing 86 (see also FIGS. 3 and 4) and two cheeks 87, 88 providing between themselves a small interval. The casing 86 is fixed against the front face of the horizontal splitting carrier 62 by means of screws simply shown by their axes 91 in FIG. 3. The two cheeks 87, 88 are fixed on the front face of casing 86 by means of screws 92, 93 (see also FIG. 4B) extending across lateral flanges 94, 95 respectively of said cheeks. A brace 96 connects the front ends of said two cheeks.

In the interval between the two cheeks 87, 88 is a splitting blade 98 having a rectilinear sharp edge 97 imparted, in its plane which is vertical, with an oscillating movement having horizontal and vertical components, meaning that its front end describes a curve which is substantially an ellipse 99 (FIG. 3). To this effect, the fang 102 of the splitting blade is carried by a plate 103 which is articulated on a crank stud 104 carried by a toothed wheel 105 rigidly connected to a transverse shaft 106 journalled in casing 86. The toothed wheel 105 is driven in rotation by an electric motor 107 supported by casing 86 and the shaft of which carries a tooth pignon 105 meshing with another intermediate toothed wheel 109 itself meshing with the toothed wheel 105. The blade 103 is moreover articulated on another pivot 112 carried by one end of a connecting rod 113 the other end of which is articulated in casing 86 by means of an axis 114.

The two cheek assembly 88 carries inner guiding means for the spine of the pig to be split which, for simplification purposes, will be carried hereinafter inner guide. Said guide designated by reference 121 is formed of a part which has substantially the shape of a bean when seen is profile as in FIG. 1, the median longitudinal plane of which is situated in the median longitudinal vertical plan "P" (FIG. 2) of the machine and the concave portion of which is turned toward the pig to be split, viz. toward the second column 2. The edge of this guide has, in the regions of its concave portion and ends, a stepped groove which, in the example, has an apex angle of the order of 100°. The upper portion of the guide is formed with a median longitudinal slot 123 for receiving and guiding the splitting blade 98, and its lower portion is formed with a median extension 125 slanting downwardly and toward the first fixed column 1; the function of the extension will be explained hereafter, when explaining the operation of the machine.

The inner guide 121 is mounted so as to rotate freely, at the apex of its concave portion, on an axis 126' carried by the lower end of a support 127 engaged into an inside recess of said guide. The support 127 is formed of two plates 131, 132 (see also FIGS. 4 and 4A) the lower ends of which are connected to each other via a screw while their upper portions, partially nested inside the outer faces of the two cheeks 87, 88 respectively, are fixed in them by means of screws 154 and 155.

It has been stated at the beginning of the specification that the second column 2 is used for supporting a dorsal guide carrier 18. To this effect, said carrier is provided at its lower portion and at its upper portion, on its left-hand side, with two rollers 161, 162 the concave runway of which closely matches the tube of uprights 16. Said two rollers roll respectively against the front and rear faces of upright 16 (FIGS. 1 and 2). During the working downward movement, said dorsal guiding carrier is positioned laterally by the vertical splitting carrier with which it is integrally connected, while during its off-load upward return movement it is guided by rollers 161 and 162 on upright 16 and by rollers 163, 164 on upright 17. The axes of the rear rollers 162, 164 are not rigidly mounted on the carrier; each roller 162 is carried by the end of one of the two branches of a bellcrank lever (having the shape of a "V" with an obtuse angle) 165 (FIG. 1) articulated to the carrier via its apex; the ends of the other two branches of said two levers are connected by a compression helical spring 166. The rollers 164 which are situated on the other side of the carrier are resiliently mounted in the same way. The return upward movement of the carrier is provided by a jack controlled by a fluid under pressure and a cable, designated as a whole by reference 168. The cylinder 169 of said jack is fixed vertically to the second column 2, while its piston 171 is rigidly connected to a point of a cable 172 passing over lower 173 and upper 174 return pulleys, the two ends of which are fixed to carrier 18.

In order that the horizontal splitting carrier 162 be absolutely integral with the inner vertical guiding carrier 18 during their common downward movement, a latching device is provided, comprising on each of the two pads 83, 84 of the inner guiding carrier 18 a latch 177 (see also FIG. 5), having the shape of a bell-crank which is articulated by its apex to the pad, while one of its branches carries a roller 178 bearing closely against the rear face of a nose 179 of the distal end of the corresponding side arm 71 of the horizontal splitting carrier 62, the other branch of said pivoting lever being connected to the piston rod of a jack controlled by a fluid under pressure 182 the cylinder of which is mounted so as to oscillate on the dorsal guiding carrier 18 by means of an axis 183.

The dorsal guide is designated as a whole by reference 185 (FIGS. 1, 5). It is formed of a control stick carrying two lower rollers 188 and two upper rollers 191. The control stick is located in a direction which is substantially vertical, in the median longitudinal vertical geometrical plane "P" of the machine. It is pivotally mounted in its middle so as to turn freely, on a transverse axis 193 carried by a clevis formed at the lower end of a lever 194 pivotally mounted on an axis 195 carried by the carrier 18 and influenced by the jack 196 controlled by a fluid under pressure 196 the piston rod of which is articulated to a crank pin 197 rigidly connected to lever 194, and the cylinder of which is articulated on an axis 198 also carried by carrier 18. Thus, the jack resiliently biases the dorsal guide 185 in the direction of arrow f (FIG. 5).

The machine is provided with means for determining the effective stroke length of the vertical splitting carrier 7. In this example, said means are formed on the one hand of a light beam emitter element 217 (FIG. 1) carried by an arm 218 fixed to the splitting head 85 and, on the other hand, by a conjugated receiving element 219 fixed at the lower portion of the carrier 18 such that the pig 3 to be split intersects the light beam as long as it is not completely split, that is including the head 3A or excluding said head, the aforementioned light emitting and receiving elements being conveniently and previously positioned to this effect.

Finally, the machine comprises a memory programmer 221 (FIG. 1) for sequentially activating all the aforementioned control means; consequently, it controls, as shown schematically in FIG. 1, the electric motor 41 controlling the upward and downward movement of the vertical splitting carrier 7, the jack 65 controlling the horizontal splitting carrier 62, the electric motor 107 driving the splitting blade 98, the jack 196 controlling the dorsal guide 185, the jack 182 controlling the latch 177 making integral the two vertical carriers and the jack and cable 168 controlling the quick upward movement of the dorsal guide carrier 18. Obviously, the light beam receiver 219 is also connected to the programmer.

The operation of the machine is the following:

Each pig to be split is successively disengaged from the standard feeding line from which the splitting machine is fed and is brought in the interval between the two columns 1 and 2, as shown in FIG. 1; the horizontal splitting carrier 62 which is in a stand-by position at the top moves forward the inner guide 121 with the splitting head 85, the two horizontal arms 71, 72 assume their position on the pads 83, 84 of the dorsal guide vertical carrier 18 and encompass the pig 3 which is solidly clamped by the dorsal guide 185 moving back against it, the splitting blade 98 starts its movement and moves downwardly with the whole vertically mobile equipment to which it is connected, the splitting operation is carried to the moment where the aforementioned mobile equipment stops at the bottom of its stroke in response to the control performed by the light beam (from emitter 217) which stops being hidden, the splitting blade stops, the horizontal splitting carrier 62 moves backward with the splitting head 85, the dorsal guide 185 moves forward, the vertical splitting carrier 7 moves back rapidly upwards, as well as the dorsal guide vertical carrier. The split pig is therefore disengaged. The machine is ready for a new cycle for another incoming pig to be split which, at the same time, expels the split pig which is reintegrated in the slaughtering line.

It is most important to explain now the particularly advantageous conditions in which the splitting work is performed by said machine. Indeed, before the splitting blade begins working, the pig is solidly clamped between the dorsal guide 185 and the inner guide 121. The roller unit 188, 191 of the dorsal guide bears closely against the back 200 of the animal and centers with great accuracy the dorsal apophysis of the pig spine 224 in the machine median longitudinal vertical plane. At the same time, the inner guide 121 bears firmly against the lower face of the spine and contributes also to its centering; moreover, its bean-shape allows automatically straightening up a possible lateral scoliosis which could impair the great accuracy of the splitting. The spine is therefore solidly clamped between the aforementioned guides which are carried by the assembly of carriers of the machine, which are in turn connected so as to form a single and very rigid block moving vertically along the two columns 1, 2. The spine is therefore rigorously positioned in the machine median vertical longitudinal plane. If one adds to this the fact that the splitting blade 98 is itself guided between the two cheeks 87, 88 of the splitting head and, above all, in the upper median slit of the dorsal guide 185 and in the upper slit of the inner guide 121, one will easily appreciate that the splitting work can be performed with exceptional accuracy and cut the apophysis of the spine exactly along its median geometrical plane. Thus, one is certain that the pig will be split into two rigorously equal portions.

It will also be remarked that when the end-pieces 78, 79 of the horizontal arms of the horizontal splitting carrier 62 engage into the matching recesses such as 82 of pads 83, 84 of the dorsal guide carrier 18, they slightly push back said carrier frontwardly, against the resilient force of springs 166 (FIG. 1) biasing the rear rollers 162, 164 against the uprights 16, 17, so that the front rollers 161, 163 get clear from said uprights. Thereby is provided a flexible guiding of the dorsal guide vertical carrier, while taking up any possible lack of parallelism between the guiding uprights 16, 17 of said carrier and the guiding uprights 5, 6 of the vertical splitting carrier 7, taking in account the fact that during their working downward stroke said two carriers are rigidly connected to each other.

What is claimed is:

1. An automatic machine for splitting butchery animals, notably pigs, characterized in that it comprises: a first fixed column (1), a second fixed column (2) providing, between itself and the first fixed column, a receiving interval for an animal to be split (3); a vertical splitting carrier (7) mobile along the first fixed column; a horizontal splitting carrier (62) mobile horizontally on the vertical splitting carrier so as to move toward and away from the second column; a splitting head (85) rigidly connected to the horizontal splitting carrier; a splitting blade (98) mounted on the splitting head and imparted, in its own plane, with an oscillating motion having horizontal and vertical components; a dorsal guiding carrier (18) for the animal to be split, vertically mobile on the second fixed column; a dorsal guide (185) mobile on the dorsal guiding carrier, in the direction of the first fixed column; two horizontal arms (71, 72) for laterally encompassing the animal to be split, rigidly connected to the horizontal splitting carrier and the distal ends of which carry end-pieces (78, 79) adapted for engaging respectively two recesses (82) having a shape matching that of said end-pieces, formed into pads (83, 84) rigidly connected to the dorsal guiding carrier; inner guiding means (21) of the spine of the animal to be split, carried by the splitting head; control means (66) for the movements of the horizontal splitting carrier (62); control means (41 through 48) for the working downward stroke of the vertical splitting carrier (7) and for the rapid off-load return stroke of said carrier; means (168) for the rapid return upward stroke of the dorsal guiding carrier (18); resilient means (196) for controlling the application of the dorsal guide (185) against the back of the animal to be split; means (4) adapted for bringing in the aforementioned interval between the two fixed columns (1, 2) an animal to be split and hung by its rear legs, and for carrying it away; means (217, 219, 221) for determining the effective stroke length of the vertical splitting carrier (7); and a programmer (221) for the sequential activation of all the aforementioned control means for carrying out the successive splitting cycles.

2. A machine according to claim 1, characterised in that it comprises means (178, 179) for latching the end-pieces (78, 79) of the arms into recesses (82) of the pads (83, 84) which are rigidly connected to the dorsal guiding carrier (18).

3. A machine according to claim 1, characterised in that the dorsal guiding carrier (18) is provided with rollers (161, 164), some of which (162, 164) which are situated opposite the second fixed column (2) turned toward the first fixed column (1) are horizontally mobile relative to said carrier and subjected to the action of the return springs (166) biasing them against said face of the second column.

* * * * *